(12) United States Patent
Amin

(10) Patent No.: US 10,711,668 B2
(45) Date of Patent: Jul. 14, 2020

(54) LUBRICATION SYSTEM MONITORING ASSEMBLY AND METHOD

(71) Applicant: FORD GLOBAL TECHNOLOGIES, LLC, Dearborn, MI (US)

(72) Inventor: Md Shahnoor Amin, Rochester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 910 days.

(21) Appl. No.: 15/006,067

(22) Filed: Jan. 25, 2016

(65) Prior Publication Data

US 2017/0211437 A1 Jul. 27, 2017

(51) Int. Cl.
| | |
|---|---|
| *F01M 11/10* | (2006.01) |
| *B60K 6/365* | (2007.10) |
| *B60K 6/445* | (2007.10) |
| *B60W 50/14* | (2020.01) |
| *B60R 17/02* | (2006.01) |

(52) U.S. Cl.
CPC ............. *F01M 11/10* (2013.01); *B60K 6/365* (2013.01); *B60K 6/445* (2013.01); *B60R 17/02* (2013.01); *B60W 50/14* (2013.01); *B60W 2050/146* (2013.01); *B60W 2420/40* (2013.01); *B60Y 2200/92* (2013.01); *B60Y 2306/03* (2013.01); *F01M 2011/1466* (2013.01); *Y10S 903/903* (2013.01); *Y10S 903/951* (2013.01)

(58) Field of Classification Search
CPC .... F02M 11/10; B60K 6/445; B60Y 2306/03; B60R 17/02; F01M 2011/1466
USPC .......................................................... 184/6.4
See application file for complete search history.

(56) References Cited

U.S. PATENT DOCUMENTS

| | | | | |
|---|---|---|---|---|
| 3,671,912 A | * | 6/1972 | La Sota | G01N 27/121 200/61.04 |
| 5,548,393 A | * | 8/1996 | Nozawa | F01M 11/10 340/631 |
| 6,253,601 B1 | * | 7/2001 | Wang | F01M 11/10 340/438 |

(Continued)

FOREIGN PATENT DOCUMENTS

| | | |
|---|---|---|
| CN | 201984053 | 9/2011 |
| WO | 0192861 | 12/2001 |

OTHER PUBLICATIONS

Kevin Murphy, Brendan Heery, Timothy Sullivan, Dian Zhang, Lizandra Paludetti, King Tong Lau, Dermot Diamond, Ernane Costa, Noel O 'Connor, Fiona Regan, A low-cost autonomous optical sensor for water quality monitoring, Talanta, Jan. 15, 2015, p. 520-527, vol. 132, Elsevier B.V.—Science Direct.

(Continued)

*Primary Examiner* — Michael R Mansen
*Assistant Examiner* — Mark K Buse
(74) *Attorney, Agent, or Firm* — David Kelley. Esq.; Carlson, Gaskey & Olds, P.C.

(57) ABSTRACT

An exemplary monitoring assembly includes a sensor that provides a first output when a lubricant reservoir holds a first amount of a contaminant, and a different, second output when the lubricant reservoir holds a different, second amount of the contaminant. A lubrication system monitoring controller operatively coupled to the sensor and configured to initiate a maintenance mode in response to the second output.

17 Claims, 2 Drawing Sheets

(56) References Cited

U.S. PATENT DOCUMENTS

| | | | | | |
|---|---|---|---|---|---|
| 2002/0148788 | A1* | 10/2002 | Berns | | F01M 1/10 210/745 |
| 2003/0116509 | A1* | 6/2003 | Manz | | F16N 29/00 210/745 |
| 2004/0135089 | A1* | 7/2004 | Manz | | G01N 21/532 250/343 |
| 2008/0302606 | A1* | 12/2008 | Alston | | F01M 11/10 184/6 |
| 2009/0011517 | A1* | 1/2009 | Hodges | | B01L 3/502715 436/139 |
| 2009/0139484 | A1* | 6/2009 | Harris | | F01M 11/0458 123/196 S |
| 2010/0299080 | A1* | 11/2010 | Willmann | | F01M 11/10 702/25 |
| 2011/0041796 | A1* | 2/2011 | Sachdev | | F01M 9/02 123/196 A |
| 2011/0267603 | A1* | 11/2011 | Shaw | | G01N 21/431 356/128 |
| 2012/0042845 | A1* | 2/2012 | Kanai | | F01M 1/10 123/196 AB |
| 2013/0345925 | A1* | 12/2013 | Smolenski | | F01M 11/10 701/31.9 |
| 2014/0019068 | A1* | 1/2014 | Schneider | | G01N 33/2888 702/30 |
| 2014/0058647 | A1* | 2/2014 | Haladyna | | B60K 6/48 701/104 |
| 2014/0318223 | A1* | 10/2014 | O'Donnell | | F01M 11/10 73/53.07 |
| 2014/0343786 | A1* | 11/2014 | Dvorak | | F01M 11/10 701/29.5 |
| 2015/0066259 | A1* | 3/2015 | Thompson | | B60W 10/06 701/22 |
| 2017/0197596 | A1* | 7/2017 | Barnes | | B60R 16/0231 |

OTHER PUBLICATIONS

Table of Characteristic IR Absorptions, retrieved from orgchem.colorado.edu_Spectroscopy_specttutor_irchart.pdf.

Bernath, Peter F., The spectroscopy of water vapour: Experiment, theory and applications, Phys. Chem. Chem. Phys., 2002, p. 1501-1509, vol. 4, The Owner Societies.

\* cited by examiner

LUBRICATION SYSTEM MONITORING ASSEMBLY AND METHOD

TECHNICAL FIELD

This disclosure relates generally to monitoring a lubrication system within a vehicle and, more particularly, to monitoring the lubrication system for contaminants.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

Both electrified vehicles and conventional motor vehicles can utilize a lubrication system that circulates a lubricant, such as oil, through the internal combustion engine and other areas. Operating the internal combustion engine can inhibit water and other contaminants from undesirably building up within the lubrication system.

Some electrified vehicles are driven in an electric mode without operating the internal combustion engine, which can lead to water and, potentially, other contaminants building up within the lubrication system. Some electrified vehicles thus periodically start the internal combustion engine to inhibit water and other contaminants from building up within the lubrication system. This approach may result in unnecessary starts of the internal combustion engine and does not account for the quality of lubricant within the lubrication system

SUMMARY

A monitoring assembly according to an exemplary aspect of the present disclosure includes, among other things, a sensor that provides a first output when a lubricant reservoir holds a first amount of a contaminant, and a different, second output when the lubricant reservoir holds a different, second amount of the contaminant. A lubrication system monitoring controller is operatively coupled to the sensor and is configured to initiate a maintenance mode in response to the second output.

In a further non-limiting embodiment of the foregoing monitoring assembly, the first amount of the contaminant is nominally no contaminant, and the second amount of contaminant comprises some contaminant.

In a further non-limiting embodiment of any of the foregoing monitoring assemblies, the sensor is an optical sensor.

In a further non-limiting embodiment of any of the foregoing monitoring assemblies, a crankcase of an electrified vehicle comprises the lubricant reservoir.

In a further non-limiting embodiment of any of the foregoing monitoring assemblies, an oil pan of an electrified vehicle comprises the lubricant reservoir.

In a further non-limiting embodiment of any of the foregoing monitoring assemblies, the sensor is configured to read an infrared frequency intensity of a fluid held within the lubricant reservoir.

In a further non-limiting embodiment of any of the foregoing monitoring assemblies, the first output is a first infrared frequency intensity and the second output is a different, second infrared frequency.

In a further non-limiting embodiment of any of the foregoing monitoring assemblies, the controller is configured to initiate the maintenance mode in response to the sensor providing the second output for a time period that exceeds a threshold time period.

In a further non-limiting embodiment of any of the foregoing monitoring assemblies, the maintenance mode comprises starting an internal combustion engine.

In a further non-limiting embodiment of any of the foregoing monitoring assemblies, the maintenance mode comprises communicating an alert to an operator.

In a further non-limiting embodiment of any of the foregoing monitoring assemblies, the contaminant is water.

A monitoring method according to another exemplary aspect of the present disclosure includes, among other things, monitoring a composition of a fluid held within a lubrication reservoir to detect a contaminant. A lubrication system monitoring controller initiates a maintenance mode in response to the monitoring.

In a further non-limiting embodiment of the foregoing method, the lubrication system monitoring controller receives a reading from an optical sensor during the monitoring.

In a further non-limiting embodiment of any of the foregoing methods, the reading corresponds to an infrared frequency intensity of the fluid.

In a further non-limiting embodiment of any of the foregoing methods, the lubrication system controller initiates the maintenance mode in response to the infrared frequency intensity exceeding a threshold infrared frequency intensity for a threshold time period.

In a further non-limiting embodiment of any of the foregoing methods, the method includes starting an internal combustion engine in response to the maintenance mode.

In a further non-limiting embodiment of any of the foregoing methods, the method includes sending an alert in response to the maintenance mode.

In a further non-limiting embodiment of any of the foregoing methods, the lubrication reservoir is within an electrified vehicle.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to monitoring a lubrication system within a vehicle for contaminants. In some examples, a vehicle enters a maintenance mode in response to detecting contaminants within the lubrication system. The maintenance mode can include starting an internal combustion engine.

Figure 1:
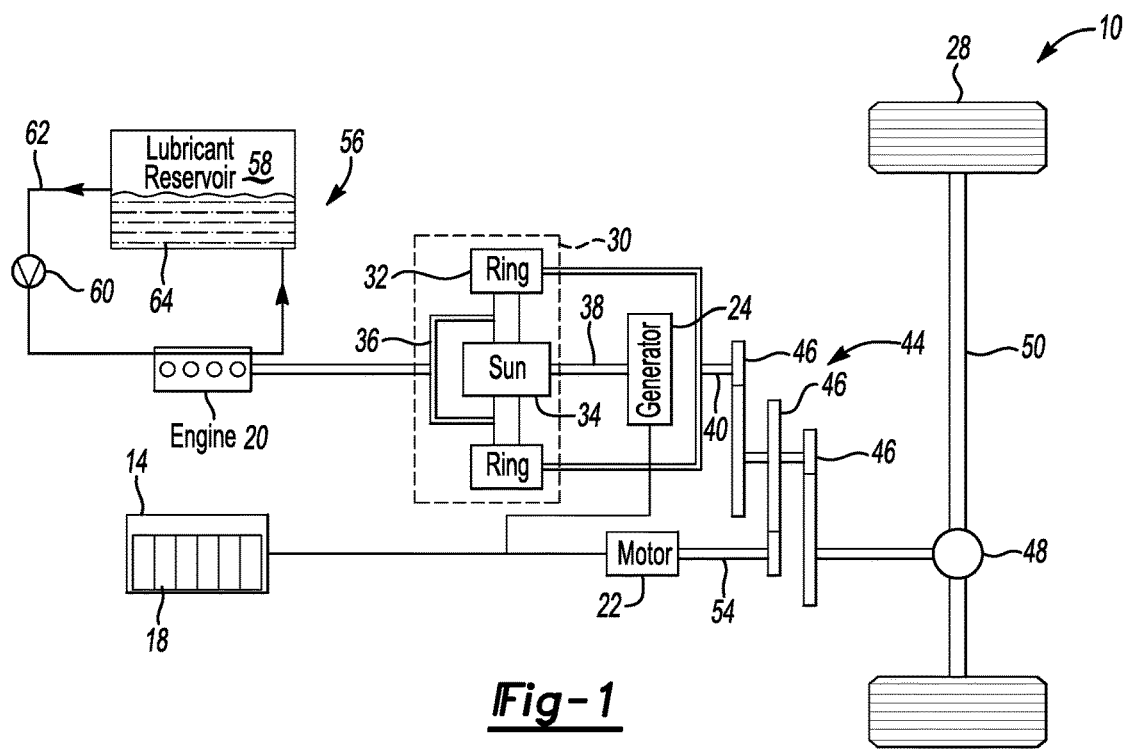
FIG. 1 shows an example electrified vehicle powertrain and a lubrication system.

Referring to FIG. 1, a powertrain 10 of a plug-in hybrid electric vehicle (PHEV) includes a traction battery 14 having battery cells 18. The powertrain 10 further includes an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the traction battery 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the traction battery 14.

A lubrication system 56 lubricates and cools the engine 20. The example lubrication system 56 includes a lubricant reservoir 58, a pump 60, and a lubricant path 62. When the engine is operating, the pump 60 circulates a lubricant 64 along the lubricant path 62 between the engine 20 and the lubricant reservoir 58. In some examples, the lubricant path 62 instead, or additionally, extends through other components of the powertrain 10, such as proximate the gears of the power transfer unit 30.

Some components of the lubrication system 56 have been omitted for clarity. A person having skill in this art and the benefit of this disclosure would understand how to use a lubrication system to circulate the lubricant 64 through portions of the powertrain 10, such as the engine 20.

Oil is an example type of the lubricant 64. As can be appreciated, water and other contaminants mixed in with the lubricant 64 are undesirable. Hydrogen atoms of water, for example, can react with other elements to form acids inside the lubricant reservoir 58, which can cause damage to the engine 20.

Figure 2:
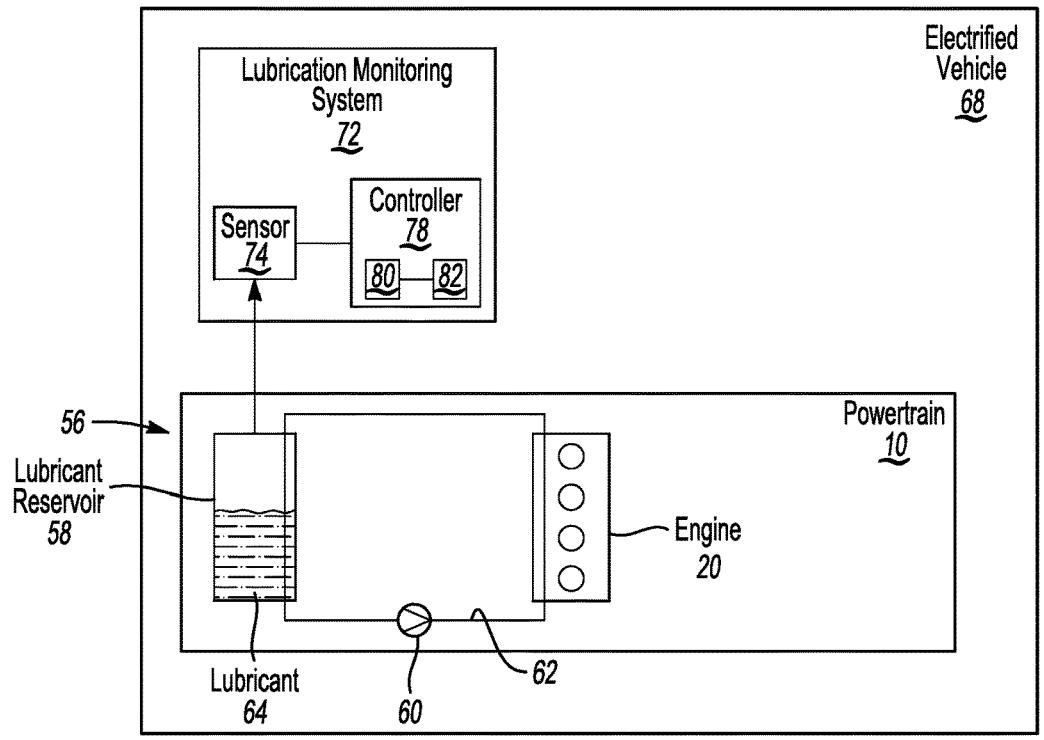
FIG. 2 shows a highly schematic view of a vehicle incorporating a lubrication system monitoring assembly and the powertrain of FIG. 1.

Referring now to FIG. 2 with continuing reference to FIG. 1, an example electrified vehicle 68 includes the lubrication system 56 and the powertrain 10. The electrified vehicle 68 is a plug-in hybrid electric vehicle (PHEV). The engine 20 of the vehicle 68 can go through extended periods of non-use. For example, power from the engine 20 may not be required to drive the vehicle 68 during low-speed commutes or short commutes.

The vehicle 68 further includes a lubrication system monitoring assembly 72 to monitor the lubrication system 56. Contaminants may build up in the lubrication system 56 if the engine 20 is not operated for an extended period of time. The monitoring assembly 72 can identify contaminants, such as liquid water, within the lubrication system 56. The monitoring assembly 72 can take action in response to, for example, an amount of the contaminants exceeding a threshold level.

The example monitoring assembly 72 includes at least one sensor 74 and a lubricant system monitoring controller 78. The example controller 78 includes a processor 80 and a memory portion 82. The processor 80 can be programmed to execute a program stored in the memory portion 82. The program can be stored in the memory portion 82 as software code. The sensor 74 and controller 78 together provide a spectrometer in this example.

The program stored in the memory portion 82 can include one or more additional or separate programs, each of which includes an ordered listing of executable instructions for implementing logical functions associated monitoring for contaminants in the lubrication system 56.

The controller 78 can be a stand-alone controller or incorporated into a control module such as an engine control unit (ECU) or powertrain control module (PCM).

In this example, the sensor 74 of the monitoring assembly 72 monitors the lubricant reservoir 58 to detect water and other contaminants within the lubrication system 56. The example lubricant reservoir 58 is an oil pan. In another example, the lubricant reservoir 58 is a crankcase associated with the engine 20. In yet another example, the lubricant reservoir 58 is simply an area of the lubrication system 56 where the lubricant 64 collects.

Figure 3:
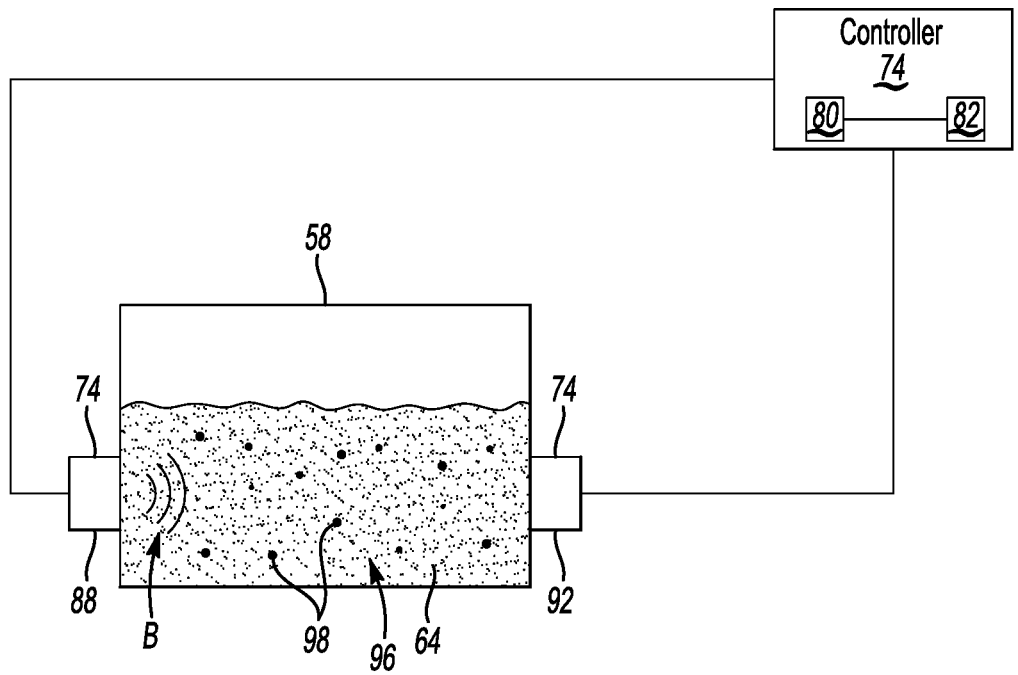
FIG. 3 shows a schematic view of an example sensor used in connection with the lubrication system monitoring assembly of FIG. 2.

Referring now to FIG. 3, with continuing reference to FIG. 2, the example sensor 74 is an optical sensor that includes an infrared emitter 88 and an infrared detector 92. In some examples, the emitter 88 is a light emitting diode (LED). The detector 92 is a photo sensor or a silicon photodiode configured to read an infrared frequency intensity for different wavelengths of a received beam of light.

The sensor 74 is mounted adjacent the lubricant reservoir 58 in this example. The lubricant reservoir 58 holds a fluid 96 that, in this example, includes the lubricant 64 and a contaminant 98, such as water.

The emitter 88 generates a beam B of light into the fluid 96. In this example, at least some of the wavelengths of the light are within the infrared spectrum. The lubricant 64 and the contaminant 98 have different infrared absorption frequencies. That is, some light having wavelengths within a first range are absorbed by the lubricant 64. Since the contaminant 98 is present, some light having wavelengths within a different, second range are absorbed by the contaminant 98.

In this example, the contaminant 98 has a higher infrared absorption frequency than the lubricant 64. The intensity of the light received by the detector 92 can thus vary at certain wavelengths depending on whether the fluid 96 is nominally lubricant 64 or something other than nominally lubricant 64, such as a mix of lubricant 64 and the contaminant 98. The infrared absorption frequency for the lubricant 64 and various potential contaminants 98 can be determined through testing or reference tables, for example.

Light that has not been absorbed by the lubricant 64 or the contaminant 98 is received by the detector 92. The intensity of the different wavelengths of the light received by the detector 92 can then be analyzed by the controller 78 to assess whether contaminants 98 are present in the fluid 96. The controller 78 thus receives a first output from the detector 92 when the fluid 96 is nominally lubricant 64, and a different, second output from the detector when the fluid 96 is a mixture of lubricant 64 and the contaminant 98.

The controller 78 can utilize absorption spectroscopy techniques to assess whether the fluid 96 is nominally lubricant 64, or whether the fluid 96 is a mix of lubricant 64 and the contaminant 98. For example, if the intensity of the wavelengths in the second range received by the detector 92 is about the same was the intensity of the wavelengths in the second range emitted by the emitter 88, the controller 78 assesses that the fluid 96 is nominally lubricant 64. If, however, the intensity of the wavelengths in the second range received by the detector 92 is decreased from the intensity of the wavelengths in the second range emitted by the emitter 88, the controller 78 assesses that the fluid 96 includes some of the contaminant 98. Thus, based on the light received by the detector 92, the controller 78 can assess that the fluid 96 is nominally lubricant 64, or that the fluid 96 is a mix of lubricant 64 and the contaminant 98.

In some examples, the detector 92 includes a first detector and a second detector separate from the first detector. Using two detectors can, among other things, facilitate a more accurate determination of whether the fluid 96 includes contaminant 98. For example, the controller 78 can compare readings from the first detector with readings from the second detector. If both detectors report similar readings to the controller 78 for some set time period, say 120 minutes, and these readings indicate that the fluid 96 includes some contaminant 98, the controller 78 can initiate the maintenance mode.

In some specific examples, the lubricant 64 is an oil having an infrared absorption frequency of about 1,200 $cm^{-1}$. Liquid water, which is an example type of the contaminant 98, has an infrared absorption frequency ranging from about 3,700-3,100 $cm^{-1}$. Thus, if the fluid 96 is nominally lubricant, the intensity of the light received by the detector 92 for the 1,200 $cm^{-1}$ frequency would be decreased relative to the intensity at the emitter 88. If, however, the fluid 96 includes lubricant and the contaminant, the intensity of the light received by the detector 92 would be decreased at both the 1,200 $cm^{-1}$ and the 3,700-3,100 $cm^{-1}$ frequencies relative to the intensities at the emitter 88.

The controller 78 can be programmed to record several readings of the infrared frequency intensities received by the detector 92 for a set time, say thirty seconds. Within the set time, the controller 78 may receive sixty readings of the infrared frequency intensities received by the detector 92 and then average the sixty readings to establish average infrared frequency intensities for the set time. The controller 78 then assesses whether the fluid 96 includes the contaminant 98 based on the average infrared frequency intensities for the set time rather than a single reading of the infrared frequency intensities.

The controller 78 can be programmed to assess that the fluid 96 includes the contaminant 98 when the readings of the infrared frequency intensities indicate that the fluid 96 includes the contaminant 98, and the readings continue for a threshold time period, say sixty minutes. If the readings do not continue for the threshold time period, the readings are dismissed as an anomaly or as meaning that the fluid 96 does not include the contaminant 98 at a level requiring a corrective action.

The readings may not continue for the threshold time period due to, for example, an operator changing the fluid 96, or the engine 20 operating and heating the fluid 96 to a temperature that boils the contaminant 98 out of the fluid 96 (212 degrees Fahrenheit for water).

The controller 78 can include an internal count-down timer to track the threshold time period. The timer starts in response to readings indicated that the fluid 96 includes the contaminant 98. The timer resets if the readings stop indicating that the fluid 96 includes the contaminant 98.

The controller 78 can also use other variables when assessing whether the fluid 96 includes contaminants 98. For example, the controller 78 can assess whether a level of the fluid 96 has changed or remained the same for a set time period, say three months, which may indicate whether the fluid 96 has been changed. If the fluid 96 has been changed, the presence of contaminants 98 is less likely.

In this example, the controller 78, assesses that the fluid 96 includes contaminants 98 based on readings from the detector 92. If the controller 78 also assess that the level of the fluid 96 has not increased or decreased (±five percent %, for example) the controller 78 initiates the maintenance mode.

In some examples, the controller 78 can average the intensities of the light received by the detector 92 at various wavelengths. The controller 78 then compares the average to a threshold infrared intensities saved in the memory portion 82 of the controller 78. If the average exceeds the threshold infrared intensity, the controller 78 assesses that the fluid 96 includes some of the contaminant 98.

In response to the controller 78 assessing that there is contaminant 98 within the fluid 96, the controller 78 can cause the powertrain 10, the electrified vehicle 68, or both, to enter a maintenance mode.

In some examples, entering the maintenance mode starts the engine 20. Operating the engine 20 can burn off the contaminant 98 within the fluid 96. The controller 78 can keep operating in the maintenance mode until the controller 78 determines that the contaminant 98 is no longer present.

In another example, entering the maintenance mode initiate an alert to an operating of the vehicle 68. The alert could be a text message or an optical light within a cabin of the vehicle 68 that notifies an operator of the vehicle 68 that the fluid 96 includes some contaminant 98. In response to the alert, the operator may, for example, change the fluid 96 within the lubrication system 56.

Other examples of the lubrication monitoring assembly 72 could utilize techniques other than spectroscopy to identify whether the fluid 96 includes the contaminant 98.

Figure 4:
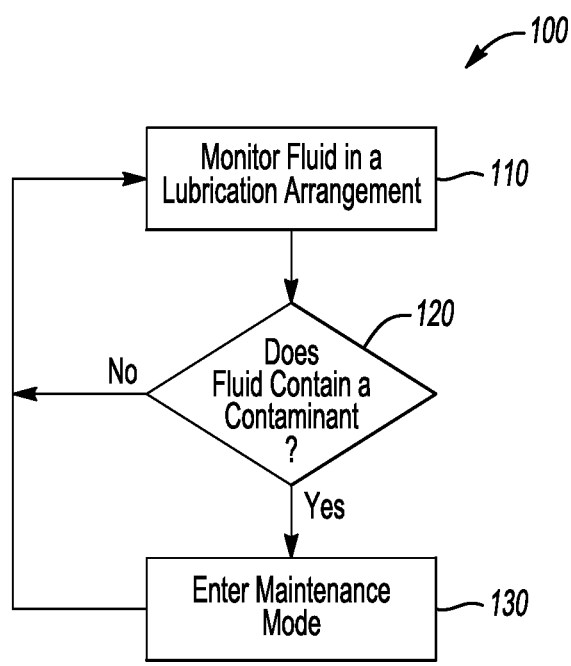
FIG. 4 shows the flow of an example lubrication system monitoring method utilized by the system of FIG. 2.

Referring now to FIG. 4 with continuing reference to FIGS. 1 and 2, an example lubrication monitoring method 100 utilized by the controller 78 includes a step 110 of monitoring the fluid 96 within a lubrication system 56 for contaminants.

If, at a step 120, the fluid does not contain contaminants, the method 100 returns to the monitoring at the step 110. If, at the step 120, the fluid does contain contaminants, the method 100 moves to a step 130.

At the step 130, the method 100 enters a maintenance mode. After the step 130, the example method 100 returns to the step 110.

Features of the disclosed examples include a system that monitors a lubrication system for contaminants and can start a maintenance mode in response to detected contaminants. Unnecessary starts of an internal combustion engine are thus avoided.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A monitoring assembly, comprising:
a sensor that provides a first output when a lubricant reservoir holds a first amount of a contaminant, and a different, second output when the lubricant reservoir holds a different second amount of the contaminant; and
a lubrication system monitoring controller operatively coupled to the sensor and configured to initiate a maintenance mode in response to the second output, the maintenance mode including starting an internal combustion engine,
wherein the sensor is an optical sensor that includes a detector, wherein the lubrication system monitoring controller is configured to calculate an average intensity of light received by the detector at various wavelengths, and further configured compare the average intensities to at least one threshold infrared intensity when assessing whether or not to initiate the maintenance mode.

2. The monitoring assembly of claim 1, wherein the first amount of the contaminant is nominally no contaminant, and the second amount of contaminant comprises some contaminant.

3. The monitoring assembly of claim 1, wherein a crankcase of an electrified vehicle comprises the lubricant reservoir.

4. The monitoring assembly of claim 1, wherein an oil pan of an electrified vehicle comprises the lubricant reservoir.

5. The monitoring assembly of claim 1, wherein the optical sensor is configured to read an infrared frequency intensity of a fluid held within the lubricant reservoir.

6. The monitoring assembly of claim 5, wherein the first output is a first infrared frequency intensity and the second output is a different, second infrared frequency.

7. The monitoring assembly of claim 6, wherein the lubrication system monitoring controller is configured to initiate the maintenance mode in response to the sensor providing the second output for a time period that exceeds a threshold time period.

8. The monitoring assembly of claim 1, wherein the maintenance mode comprises communicating an alert to an operator.

9. The monitoring assembly of claim 1, wherein the contaminant is water.

10. A monitoring method, comprising:
monitoring a composition of a fluid held within a lubrication reservoir to detect a contaminant;
a lubrication system monitoring controller that initiates a maintenance mode in response to the monitoring; and
starting an internal combustion engine in response to the maintenance mode,
wherein the lubrication system monitoring controller receives a reading from an optical sensor during the monitoring,
wherein the optical sensor includes a detector, wherein the controller is configured to calculate an average intensity of light received by the detector at various wavelengths, and further configured compare the average intensities to at least one threshold infrared intensity when assessing whether or not to initiate the maintenance mode.

11. The monitoring method of claim 10, wherein the reading corresponds to an infrared frequency intensity of the fluid.

12. The monitoring method of claim 11, wherein the lubrication system monitoring controller is further configured to initiate the maintenance mode in response to the infrared frequency intensity exceeding a threshold infrared frequency intensity for a threshold time period.

13. The monitoring method of claim 10, further comprising sending an alert in response to the maintenance mode.

14. The monitoring method of claim 10, wherein the lubrication reservoir is within an electrified vehicle.

15. The monitoring method of claim 13, wherein the detector is a first detector and the optical sensor further includes a second detector, wherein the monitoring further includes comparing an infrared frequency intensity reading taken by the first detector to an infrared frequency intensity reading taken by the second detector.

16. A monitoring assembly, comprising:
an optical sensor that provides a first output when a lubricant reservoir holds a first amount of a water, and a different, second output when the lubricant reservoir holds a different second amount of the water; and
a lubrication system monitoring controller operatively coupled to the optical sensor and configured to initiate a maintenance mode in response to the second output, the maintenance mode including starting an internal combustion engine, the lubrication system monitoring controller further configured to initiate the maintenance mode in response to the sensor providing the second output for a time period that exceeds a threshold time period,
wherein the optical sensor includes a detector, wherein the controller is configured to calculate an average intensity of light received by the detector at various wavelengths, and further configured compare the average intensities to at least one threshold infrared intensity when assessing whether or not to initiate the maintenance mode.

17. The monitoring assembly of claim 16, wherein the optical sensor includes a light emitter and the detector, wherein the second output corresponds to an intensity of light received by the detector being decreased within an infrared absorption frequency range relative to an intensity of light at the light emitter in the infrared absorption frequency range.

* * * * *